Dec. 18, 1923.                                              1,477,673
L. SUBER ET AL
COLLECTING MAIN FOR COKE OVENS
Filed June 21, 1922
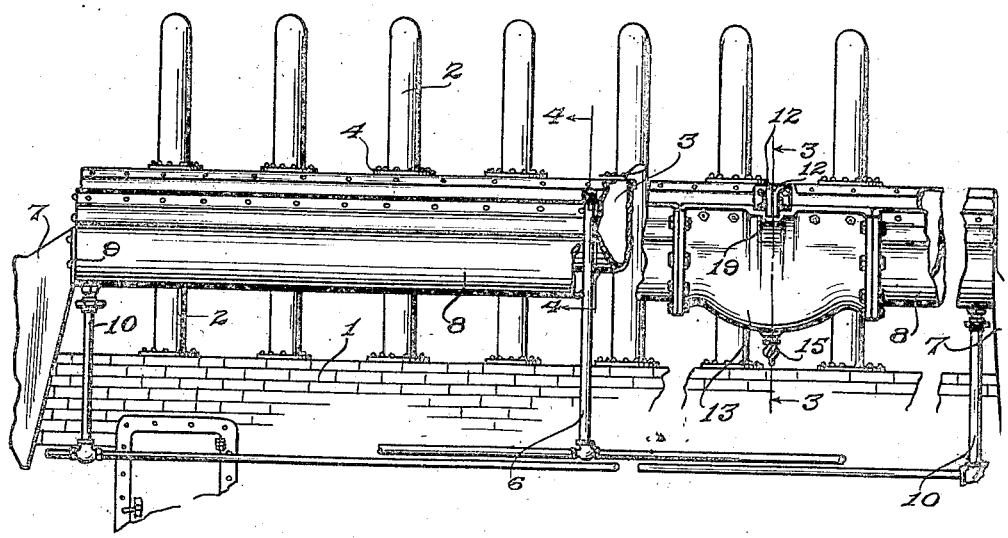
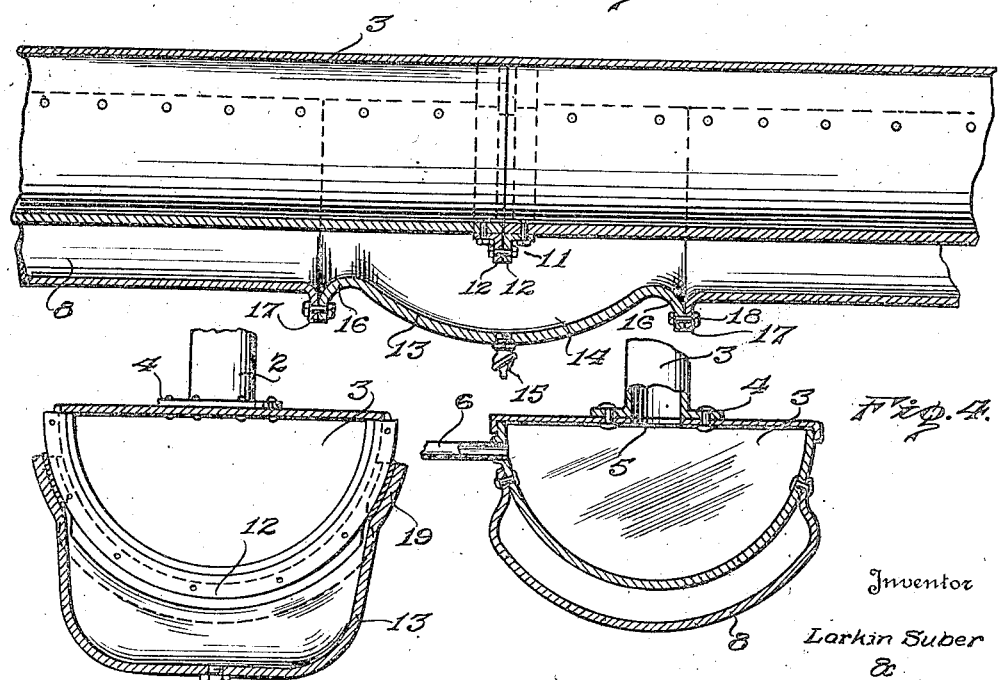
Inventor
Larkin Suber
&
Elbert Mercer
By Lacey & Lacey, Attorneys Patented Dec. 18, 1923.

1,477,673

UNITED STATES PATENT OFFICE.

LARKIN SUBER AND ELBERT MERCER, OF EAST YOUNGSTOWN, OHIO.

COLLECTING MAIN FOR COKE OVENS.

Application filed June 21, 1922. Serial No. 569,967.

*To all whom it may concern:*

Be it known that we, LARKIN SUBER and ELBERT MERCER, citizens of the United States, residing at East Youngstown, in the county of Mahoning and State of Ohio, have invented certain new and useful Improvements in Collecting Mains for Coke Ovens, of which the following is a specification.

This invention has for its object the provision of simple and inexpensive means whereby the removal of the tarry elements of the products of distillation rising from coke ovens will be facilitated. In the operation of coke ovens, various valuable substances or by-products rise from the oven and, in order to reclaim these by-products, it is common practice to provide a conduit or collecting main extending past the coke ovens in the plant above the same and lead the stand pipes which rise from the coke oven into the top of this conduit. The products of distillation are very hot and in order to condense the same, water is pumped through this conduit so that the valuable substances contained in the gases and products are condensed quickly and flow through the conduits to traps at the ends of the same. When these valuable products are condensed through impact and combination with the water, they form a tarry substance which tends to adhere to the sides and bottom of the water-cooled conduit, and this adhesion of the particles and substances to the sides of the conduit necessitates the employment of laborers whose duty it is to insert tools through openings provided therefor in the top of the conduit and by manipulation of these tools remove the adhering matter from the walls of the conduit so that it will be carried to the traps by the force of the circulating water. This operation not only entails a very heavy expense upon the owners and managers of the coke oven plants but endangers the health of the laborers, and it is the prime object of our invention to provide means for maintaining the bottom of the conduit or collecting main in a heated condition so that the products condensed from the gases and fumes will be prevented from adhering to the walls of the conduit and, therefore, the number of the laborers will be reduced. The objects of our invention are attained in such an apparatus as is illustrated in the accompanying drawings, and the invention consists in certain novel features which will be hereinafter first fully described and then particularly pointed out in the appended claims.

In the drawings—

Figure 1 is a side elevation, partly broken away, of a portion of our apparatus, parts of a coke oven plant being shown in order that the purpose and operation of our invention may be readily comprehended;

Fig. 2 is an enlarged longitudinal section through our improved apparatus;

Fig. 3 is a transverse section on the line 3—3 of Fig. 1;

Fig. 4 is a transverse section on the line 4—4 of Fig. 1.

In the drawings, the reference numeral 1 indicates a portion of a block of coke ovens, from the tops of which a series of stand pipes 2 rise to convey the gases and products arising from the oven to and into a conduit 3 which extends past the entire bank of ovens and may be supported above the same in any convenient or preferred manner or may be merely secured to the ends of the stand pipes by bolts or rivets inserted through flanges 4 at the discharge ends of the stand pipes and through the top plates of the conduit, openings 5 being formed through the top plates of the conduits so that the stand pipes may discharge directly and freely into the same. As shown most clearly in Figs. 3 and 4, the conduit 3 is of a crescent form in cross section so that a trough is provided through which the water and other matter may freely flow. As now constructed, openings are provided through the top plate of the conduit adjacent the sides of the same to permit the insertion of the scrapers or other tools by manipulation of which the sticky matter is removed from the walls of the conduit, but in the use of our invention, these openings are unnecessary and are omitted so that the top of the conduit is imperforate and closed throughout its area, thereby preventing possible leakage of the products and gases. Water or flushing liquid is pumped into the conduit through a supply pipe 6 from the boiler house or other point of supply, and it is customary to connect the supply pipe with the conduit midway the ends thereof and permit the water to flow toward both ends, traps 7 being provided at the ends of the conduit to catch the water and valuable by-products and separate the by-products to be reclaimed from the water. These traps are indicated conventionally in Fig. 1 inasmuch as their form and details of construction do not form parts of our present invention.

In carrying out our invention, we employ a supplemental trough or jacket 8 which extends the full length of the conduit 3 and is secured to the sides thereof so as to conform to the bottom thereof, as shown clearly in Fig. 4. The ends of this supplemental trough or jacket are closed, as indicated at 9, and supply pipes 10 enter the bottom of the said jacket or trough adjacent the ends thereof so as to admit steam thereto from the boiler house of the coke oven plant. If desired, a return pipe may be connected to the steam jacket or trough so as to carry the waters of condensation back to the boiler and thereby effect a continuous circulation through the jacket. By referring to Fig. 4 more particularly, it will be noted that the jacket or trough 8 is shallow and concentric with the bottom of the conduit so that the steam is caused to play directly upon the bottom of the conduit and through substantially the entire area thereof and maintain the conduit in a heated condition. The water in the conduit will, consequently, be raised in temperature so that the hot gases and products will not be condensed and precipitated so rapidly as to stick to the sides of the conduit but at the same time will be condensed so that they will not escape but may be readily reclaimed. It will be readily noted that inasmuch as the tarry substances of the gases and products will not adhere to the sides of the conduit, the manual labor now required under the present practices will be reduced and the expense of operation of the plants will be materially reduced.

The conduit 3 is constructed of axially alined sections and the meeting ends of adjacent sections are connected by packed joints, as indicated at 11. These joints may be of any preferred formation but are usually constructed of angles irons 12 bolted or riveted through one web to the outer surface of the bottom of the conduit and connected through their depending webs, as clearly shown in Fig. 2, any suitable packing being interposed between the opposed surfaces so that leakage is prevented. These joints are not only desirable in order to permit the use of relatively short lengths of material in forming the conduit but also are advantageous inasmuch as it is sometimes necessary to repair or replace portions of the conduit and such work is facilitated by the employment of joints having removable parts. Obviously, the steam jacket must provide for access to these joints and for that purpose, we provide the joint member 13 which forms a bridge or connecting member between opposed ends of adjacent sections of the jacket below the joint of the conduit. This joint member is dished, as shown at 14, and is preferably provided with a drain cock 15 so that the waters of condensation may be removed therefrom when access to the joint is necessary. This joint member has its end edges turned outwardly, as shown at 16, and caused to abut outturned flanges 17 on the meeting ends of the jacket sections, bolts or rivets 18 being inserted through the said edges so as to secure the joint member firmly in place. The longitudinal edges of the joint member are secured rigidly and closely to the side walls of the conduit and are offset between their ends, as shown at 19, so as to fit closely around the outwardly extending webs of the angle irons 12.

The operation of our device is thought to be clear from what has been said and the advantages to be derived from its use are thought to be obvious. The steam admitted to the jacket may be exhaust steam from the engines or the boilers now provided in the operation of the coke ovens and the circulation of this steam may be controlled at the boiler house, or the supply pipe 10 may be equipped with valves as may be deemed desirable. The water supply pipe 6 may also be provided with a cutoff valve if deemed necessary, but as these valves may be of any well-known form, we have thought that the illustration of the same is unnecessary.

Having thus described the invention, what is claimed as new is:

1. The combination with the collecting main of a coke oven plant, of a shallow heating jacket secured to the main and extending under and close to the bottom thereof from end to end of the same, and a dished joint member removably fitted in the jacket and secured to the main under a joint thereof.

2. The combination with the collecting main of a coke oven plant, said main consisting of sections connected end to end and having external flanges at the joints, of a shallow trough-like steam jacket consisting of sections having their side edges secured to the sides of the main whereby the jacket will be supported under the bottom of the main and close to the same, the ends of the sections being outturned, and a dished joint member having outturned ends removably secured to the opposed outturned ends of adjacent sections of the jacket and removably secured to the sides of the main over a joint therein, said joint member having a drain cock in its bottom and having its side edges offset between its ends whereby to fit closely around the flange at the joint of the main.

In testimony whereof we affix our signatures.

LARKIN SUBER, [L. S.]
ELBERT MERCER. [L. S.]